Sept. 3, 1935.  C. M. McCARTHY  2,013,216
GLASS HOLDING AND BREAKING DEVICE
Filed Oct. 6, 1933
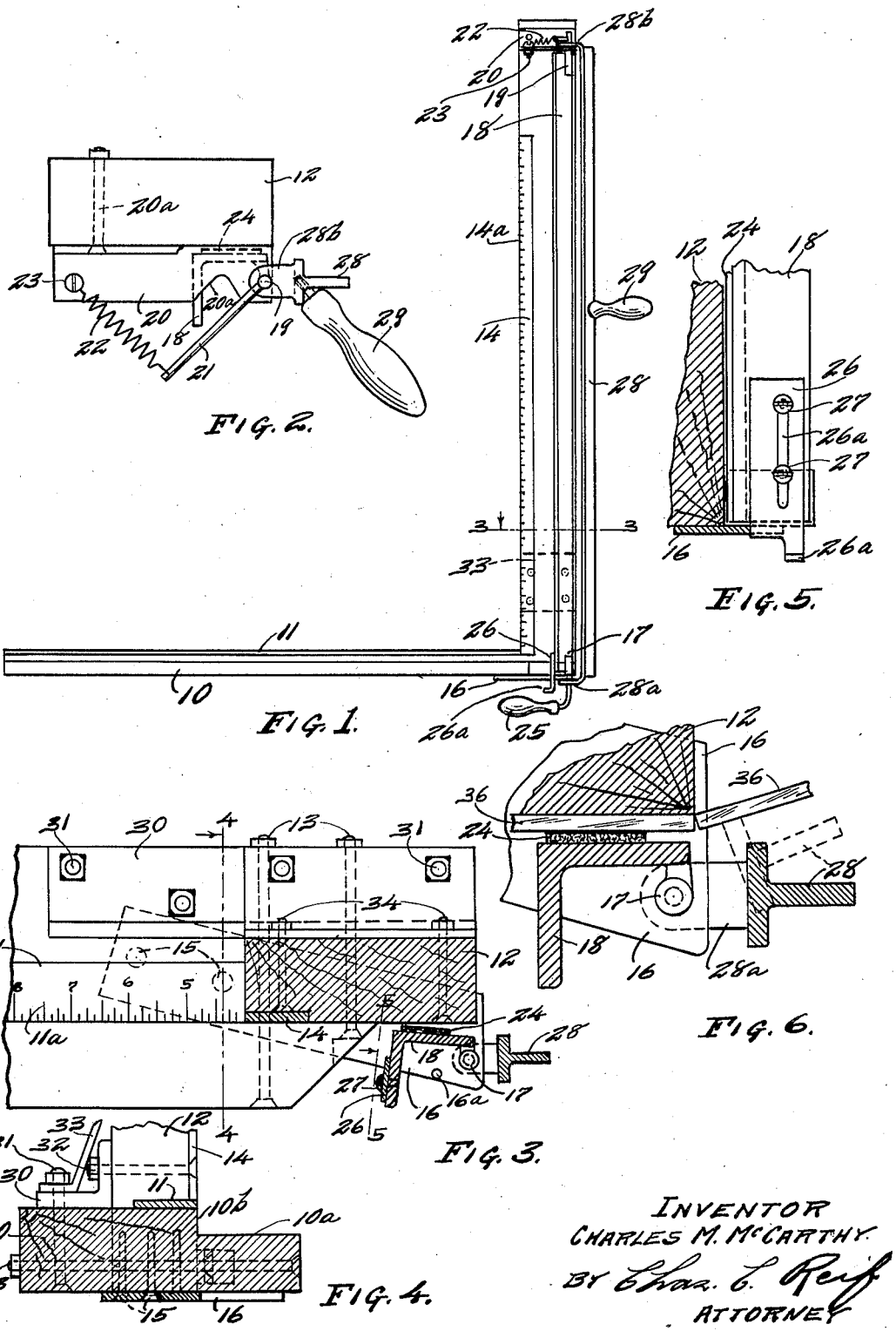
INVENTOR
CHARLES M. McCARTHY
BY Chas. C. Reif
ATTORNEY Patented Sept. 3, 1935

2,013,216

UNITED STATES PATENT OFFICE 2,013,216

GLASS HOLDING AND BREAKING DEVICE

Charles M. McCarthy, Minneapolis, Minn.

Application October 6, 1933, Serial No. 692,455

7 Claims. (Cl. 49—48)

This invention relates to a device or apparatus for holding, cutting and breaking glass. It is necessary to cut panes or pieces of glass to fit various applications thereof and this work is commonly done in stores selling glass, lumber yards and other similar establishments. It is desirable to have a device by mean of which the glass can be conveniently and easily handled and positioned for cutting and one in which it can be accurately and quickly broken along the cut after the same is made.

It is an object of this invention to provide a very simple and efficient device having supporting means for a piece of glass, a member having a surface against which the glass can be pressed, a member including a yielding means engaging the glass to hold it against said surface, a straight edge along which a tool can be moved for making a cut in said glass and means for resiliently urging said member toward said surface.

It is a further object of the invention to provide a device having means for supporting a pane of glass, a member having a surface engaged by said glass, a straight edge along which a tool can be moved for making a cut in said glass and movable means for engaging said glass to break the same along said cut.

It is another object of the invention to provide a member having a surface for supporting a piece of glass, a second member extending at right angles thereto having a surface to be engaged by said glass, a member swingable toward and from said surface, a yielding means on said last mentioned member for engaging the glass, a resilient means urging said last mentioned member toward said surface and a handle for swinging said last mentioned member away from said surface.

It is still another object of the invention to provide a device for holding and cutting glass comprising a member having a surface against which the glass is pressed, another surface extending at an angle to said surface making a corner on said member, a straight edge adjacent said corner along which a tool can be moved for making a cut in said glass and movable means for pressing the glass toward said corner to break the same along said cut.

These and other objects and advantages of the invention will be fully set forth in the following description made in connection with the accompanying drawing, in which like reference characters refer to similar parts throughout the several views and in which:—

Fig. 1 is a view in front elevation of the device;

Fig. 2 is a top plan view;

Fig. 3 is a horizontal section taken on line 3—3 of Fig. 1 as indicated by the arrow;

Fig. 4 is a vertical section taken on line 4—4 of Fig. 3 as indicated by the arrow;

Fig. 5 is a vertical section taken on line 5—5 of Fig. 3 as indicated by the arrow; and Fig. 6 is a view similar to Fig. 3, some parts being omitted illustrating the manner of breaking the glass, Figs. 2 to 6 being shown on an enlarged scale.

Referring to the drawing, a glass manipulating device is shown comprising a member 10. While this member might be made of various materials, in the embodiment of the invention illustrated, it is shown as made of wood. Member 10 is illustrated as of general rectangular form in cross section, the same having its front part cut away to have a surface 10a thereon which, in the position of the device illustrated, extends horizontally. A member 11, shown as rectangular in cross section, is secured on the top of member 10 and has a scale 11a thereon. The cut away portion of member 10 also forms a vertical surface 10b at right angles to surface 10a and a member 12 is provided also of rectangular form in cross section, the same having one flat surface flush with surface 10b, said member 12 extending at right angles to member 10. As illustrated member 12 is mortised into member 10 at its lower portion and connected thereto by a pair of headed and nutted bolts 13. As illustrated in Fig. 3, the portion of member 10 below surface 10a is beveled off in front of member 12. Member 12 has a member 14 set into the edge thereof also rectangular in cross section and having a scale 14a on its front surface. Member 10 has secured to the bottom thereof by a plurality of screws 15 a plate 16. Plate 16 is bored to receive the reduced end of a pintle 17 rotatable in said plate, said pintle 17 being secured to a member 18 extending upwardly from plate 16, the same being illustrated as in the form of an angle bar. Member 17 will be secured to member 18 in any suitable manner as by welding. Member 18 also has secured to its upper end a pintle member 19 having a portion extending through a bracket 20 formed of an angle iron and secured to vertical member 12 adjacent the upper end thereof by bolts 20a. Pintle member 19 above bracket 20 has a rod 21 secured thereto extending forwardly and laterally adjacent the outer end of which is secured one end of a tensile coiled spring 22 secured at its other end by a headed and nutted bolt 23 in bracket 20. Member 18 has secured to its side adjacent member 12 a strip or pad 24 of yielding material. While member 24 may be made of rubber or some rubber compound, in practice a strip of fabric belting has been found to be very suitable. The pintle 17 extends below the plate 16 and projects laterally, the same having secured thereto a handle member 25. It will be seen that spring 22 urges member 18 in a clockwise direction toward member 12 and said member may be swung in the opposite direction by handle 25. A stop pin 16a upstands from member 16 limiting swinging movement of member 18. As shown in Fig. 3 plate 16 extends at an angle to the front edge of member 10. A small slide 26 is mounted on one side of member 18, the same having an elongated slot 26a therein through which pass spaced screws 27 secured in member 18. Slide 26 is freely movable upwardly and downwardly as permitted by slot 26a and screws 27. Said slide has a portion cut away at its lower end and said end is bent laterally as shown in Fig. 1. The lower end of member 26 at its full width is arranged to engage the outer end of plate 16 when said member is in its lowest position.

A member 28 is provided illustrated as in the form of a T-bar, said member extending vertically parallel to member 12. Member 28 has its stem portion and a part of its flange cut away at the top and bottom, the remaining part of the flange being bent substantially at a right angle. At the lower end this bent portion 28a is apertured to have the pintle 17 pass therethrough and the bent portion 28b at the upper end is apertured to have the pintle 19 pass therethrough, this portion 28b resting on and being supported on bracket 20. It will be understood that pintle members 17 and 19 are co-axial. Member 28 is thus mounted for swinging movement about the axis of said pintles. Bracket 20 has a notch 20a cut therein to accommodate the movement of member 28 when the latter is swung to its extreme position. Member 28 is provided with a handle 29 intermediate its ends.

As stated, member 12 is mortised into member 10 and secured thereto by the bolts 13. An angle bracket 30 is also bolted to the top of member 10 by the bolts 31 and is also bolted by the bolts 32 to member 12. A plate 33 has a horizontal lower portion overlying the horizontal flange of angle bracket 30 through which two of the bolts 31 also pass. This plate extends upwardly at an angle to the rear side of member 12 and then extends upwardly some distance in contact with the rear side of member 12, being bolted thereto by the bolts 34. Members 10 and 12 are thus held accurately and rigidly in connected position.

In operation, when it is desired to cut a piece of glass, the device is usually placed with member 12 extending vertically and member 18 is swung outwardly in a counter clockwise direction so that slide 26 drops down to have the lower end of its side portion engage the edge of plate 16. Plate 18 and the pad 24 are then held sufficiently away from the front surface of member 12 so that a piece of glass can readily be passed therebetween. The piece of glass is placed in vertical position with its lower edge resting on the surface 10a and one flat side thereof engaging the surfaces 10b and the front surface of member 12. The glass is now moved along on surface 10a until it is in the desired position to be cut. The size of the glass both horizontally and vertically can readily be determined by the scales 11a and 14a. When the glass is properly positioned, the operator takes hold of handle 25, moving the same outwardly slightly and with one finger raises slide 26 and then allows the handle 25 and member 18 to swing inwardly or clockwise so that pad 24 is brought into engagement with the glass 36 as shown in Fig. 6. Stop pin 16a is provided to prevent excessive stretching of spring 22. The operator now takes a glass cutting tool of the type which is well known and moves the same along the outer or right hand edge of member 18, using the straight edge of said member as a guide and makes a scratch or cut in the pane of glass which will be substantially opposite the outer corner of member 12 or in line with the outer surface thereof. The operator now takes hold of the handle 29 and swings member 28 in a counter-clockwise direction so that one edge thereof is swung against the glass 36 beyond member 12. The glass now breaks cleanly and accurately along the entire length of the cut. It will be seen that the glass is held firmly by the pad 24 throughout the length thereof under the pressure of spring 22 and the same will be engaged evenly throughout the length thereof by member 28. A clean and accurate cut and break of the glass is thus obtained. It will be noted that it is not necessary to move the glass after the same has been cut by the tool and before the same is broken. The cutting tool can be disposed between members 18 and 28 or member 28 can be swung clockwise in front of member 18 and the tool thus used at the right of member 28 as shown in Figs. 1, 3 and 6. After the glass is broken the handle 25 can be again swung outwardly slightly to relieve the pressure of pad 24 against the glass, the member 26 drops downwardly engaging the edge of plate 16 and holding member 18 in an outward position so that the glass can be readily removed. The whole operation is thus easily and quickly performed and a perfect job can be done.

The two bolts 31 passing through the plate bracket 33 can be removed as can also the bolts 13 and member 12 can then be removed from member 10 so that said members may be placed in parallel position for shipping.

From the above description it is seen that applicant has provided a very simple and efficient device for holding, measuring, cutting and breaking glass. The structure is quite rugged, comprises comparatively few parts and requires no attention for maintenance. The device has been actually used in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:—

1. A device for holding a sheet of glass to be cut with a hand cutter having in combination, a member having a surface arranged to be engaged by a straight edge of said sheet, said member also having a flat surface engaged by the flat surface of said sheet, a second member extending at right angles to said member having a surface in the same plane as said second mentioned surface, a member extending longitudinally of said second member and surface and pivotally mounted to swing toward the same and said sheet and having a surface extending therealong and adapted to engage said sheet to press it against said last mentioned surface, resilient means urging said last mentioned member to said position, said last mentioned member having a straight edge extending longitudinally of and adjacent said last mentioned surface against which a cutter may be held and guided to cut said sheet.

2. A device for holding a sheet of glass to be cut with a hand cutter having in combination, a member having a surface arranged to be engaged by the straight edge of said sheet, a second member extending at right angles to said member having a surface disposed at right angles to said first mentioned surface and having a corner-forming edge beyond which part of said sheet extends, a member extending longitudinally of said last mentioned member and surface and pivotally mounted to swing toward the same and said sheet and having a surface extending therealong adapted to engage said sheet and press the same against said second mentioned surface, resilient means urging said last mentioned member to said position, said last mentioned member having a straight edge disposed substantially over said first mentioned edge against which a cutter may be held and guided to cut said glass.

3. The structure set forth in claim 2 and means for holding said member with its surface spaced from said second mentioned surface so that a sheet of glass may be inserted in said device.

4. A portable device for holding a sheet of glass to be cut with a hand cutter having in combination, a member having a surface arranged to be engaged by the straight edge of said sheet, said member also having a flat surface engaged by the flat surface of said sheet, a second member extending at right angles to said member having a surface in the same plane as said second mentioned surface and having an edge beyond which part of said sheet extends, a member extending longitudinally of said second member and surface and pivotally mounted to swing toward the same and said sheet and having a surface extending therealong adapted to engage said sheet and press the same against said third mentioned surface, resilient means constantly urging said last mentioned member to said position, said last mentioned member having a straight edge disposed substantially over said first mentioned edge against which a cutter may be held and guided to cut said glass and a member swinging about an axis substantially parallel to said third mentioned surface and extending adjacent the same having a portion adapted to engage the glass extending beyond said first mentioned edge and press the same against said edge after being cut to sever the same.

5. A device for holding a sheet of glass to be cut with a hand cutter having in combination, a member having a surface arranged to be engaged by the straight edge of said sheet, said member also having a flat surface engaged by the flat surface of said sheet, a second member extending at right angles to said member having a surface in the same plane as said second mentioned surface and having an edge beyond which part of said sheet extends, a third member extending longitudinally of said second member and surface and pivotally mounted to swing toward the same and said sheet and having a surface extending therealong adapted to move to position to engage said sheet and press the same against said third mentioned surface, resilient means constantly urging said third member to said position, said third member having a straight edge disposed substantially over said second mentioned edge against which a cutter may be held and guided to cut said glass and a member pivotally mounted to swing about the same axis as said third member and extending longitudinally of said third member and substantially parallel to said third mentioned surface, the same being movable against the portion of said sheet projecting beyond said second mentioned edge substantially throughout the length thereof to press the same against said edge and sever the same.

6. A device for holding a sheet of glass to be cut with a hand cutter having in combination, a member having a surface arranged to be engaged by a straight edge of said sheet, said member also having a flat surface engaged by the flat surface of said sheet, a second member extending at right angles to said member having a surface in the same plane as said second mentioned surface, means projecting adjacent the ends of said second member, a member pivotally mounted in and extending between said means along said second member and last mentioned surface and having a surface movable toward said last mentioned surface to engage said sheet and press the same against said third mentioned surface, resilient means constantly urging said third member to said sheet-engaging position, a handle for swinging said third member away from sheet-engaging position and means carried on said third member for holding it away from sheet-engaging position but movable to release it to permit it to be moved to sheet-engaging position.

7. A device for holding a sheet of glass to be cut having in combination, a member having a surface arranged to be engaged by a straight edge of said sheet, said member also having a flat surface engaged by the flat surface of said sheet, a second member extending at an angle to said member having a surface disposed substantially in the same plane as said second mentioned surface, a member extending longitudinally of said second member and pivotally mounted to swing toward the same and said sheet and having a surface extending therealong and adapted to be moved to position to engage said sheet and press the same against said last mentioned surface, said last mentioned member having a straight edge extending longitudinally of and adjacent said second member and the surface thereof along which a cutter may be moved and guided to cut said sheet.

CHARLES M. McCARTHY.